United States Patent
Boeck

(10) Patent No.: US 9,540,946 B2
(45) Date of Patent: Jan. 10, 2017

(54) SAFETY DEVICE FOR A BEARING ARRANGEMENT OF A ROTOR OF A TURBOMACHINE

(71) Applicant: MTU Aero Engines AG, Munich (DE)

(72) Inventor: Alexander Boeck, Kottgeisering (DE)

(73) Assignee: MTU Aero Engines GmbH, Munich (DE)

( * ) Notice: Subject to any disclaimer, the term of this patent is extended or adjusted under 35 U.S.C. 154(b) by 304 days.

(21) Appl. No.: 14/464,389

(22) Filed: Aug. 20, 2014

(65) Prior Publication Data

US 2015/0267554 A1    Sep. 24, 2015

(30) Foreign Application Priority Data

Aug. 21, 2013  (DE) .................. 10 2013 216 598

(51) Int. Cl.
| | | |
|---|---|---|
| *F16C 41/00* | (2006.01) | |
| *F01D 21/04* | (2006.01) | |
| *F01D 25/16* | (2006.01) | |
| *F16C 19/52* | (2006.01) | |

(52) U.S. Cl.
CPC ........... *F01D 21/045* (2013.01); *F01D 25/164* (2013.01); *F16C 19/522* (2013.01); *F05D 2240/20* (2013.01); *F05D 2240/50* (2013.01); *F05D 2260/311* (2013.01)

(58) Field of Classification Search
CPC ...... F16C 19/52; F16C 19/522; F16C 2360/23
USPC ........................................................ 384/624
See application file for complete search history.

(56) References Cited

U.S. PATENT DOCUMENTS

| | | |
|---|---|---|
| 5,433,584 A | 7/1995 | Amin et al. |
| 5,733,050 A | 3/1998 | Diepolder |
| 5,791,789 A | 8/1998 | Van Duyn et al. |
| 6,447,248 B1 * | 9/2002 | Kastl ................. F01D 21/045 384/535 |
| 8,573,922 B2 * | 11/2013 | Milfs ................. F16C 19/56 384/624 |
| 2014/0161601 A1 | 6/2014 | Geiger |
| 2015/0176427 A1 * | 6/2015 | Denis ................. F01D 21/045 60/779 |

FOREIGN PATENT DOCUMENTS

| | | |
|---|---|---|
| DE | 19605971 | 8/1997 |
| DE | 10157576 | 6/2003 |
| DE | 698 20 517 | 6/2004 |
| DE | 102010012228 | 9/2011 |
| DE | 10 2011 108 957 | 1/2013 |

(Continued)

*Primary Examiner* — James Pilkington
(74) *Attorney, Agent, or Firm* — Davidson, Davidson & Kappel, LLC

(57) ABSTRACT

A safety device (10) for a bearing arrangement of a rotor of a turbomachine, whereby the safety device (10) includes at least two support structures (12) between which at least one buckling structure (14) is arranged that is configured to collapse when a predetermined buckling load that acts on at least one of the support structures (12) is exceeded, thereby reducing the volume of the safety device (10). A method for the production of a safety device (10) for a bearing arrangement of a rotor of a turbomachine, as well as to a bearing arrangement of a rotor of a turbomachine having such a safety device (10).

23 Claims, 2 Drawing Sheets

(56) References Cited

FOREIGN PATENT DOCUMENTS

| EP | 1199441 | 4/2002 |
|----|---------|--------|
| FR | 2877994 | 5/2006 |
| GB | 2401651 | 11/2004 |

* cited by examiner

SAFETY DEVICE FOR A BEARING ARRANGEMENT OF A ROTOR OF A TURBOMACHINE

This claims the benefit of German Patent Application DE 10 2013 216 598.6, filed Aug. 21, 2013 and hereby incorporated by reference herein.

The invention relates to a safety device for a bearing arrangement of a rotor of a turbomachine. Moreover, the invention relates to a method for the production of such a safety device as well as to a bearing arrangement of a rotor of a turbomachine having such a safety device.

BACKGROUND

In case of a blade failure in a turbine engine, for example, because of a bird strike or the like, high unbalances occur in the rotor which, in the worst-case scenario, can damage or even destroy the bearing arrangement of the rotor as well as other static structures, including the engine mount. In order to rule this out to the greatest extent possible, mechanical safety devices can be used that radially release the rotor when a limit force is exceeded, so that unbalance forces can no longer occur. A bearing arrangement with a safety device comprising a predetermined breaking point that intentionally breaks when certain radial limit forces are exceeded and that decouples the rotor from the bearing arrangement is known, for example, from European patent application EP 1 199 441 A2.

A main problem of these safety devices, however, is the configuration of the predetermined breaking points since, with such predetermined breaking points, the limit force can only be set very imprecisely because of the component tolerances, the scatter of the material properties and the scatter range of the rupture mechanics. Consequently, such safety devices cannot be used in environments in which there are only relatively small differences between impermissible unbalance forces and the forces that are present during the normal operation of a turbomachine.

SUMMARY OF THE INVENTION

It is an object of the present invention to provide a safety device for a bearing arrangement of a rotor of a turbomachine that permits the limit force to be set more precisely. Additional or alternative objectives of the invention lie in the provision of a method for the production of such a safety device as well as in the provision of a bearing arrangement of a rotor of a turbomachine having such a safety device.

The present invention provides a safety device for a bearing arrangement of a rotor of a turbomachine in which it is provided according to the invention that the safety device comprises at least two support structures between which at least one buckling structure is arranged that is configured to collapse when a predetermined buckling load that acts on at least one of the support structures is exceeded, thereby reducing the volume of the safety device. In other words, with the safety device according to the invention, the triggering of the mechanical safety means is not controlled by the rupturing of certain elements but rather by the fact that the buckling structure collapses or buckles without rupturing. In comparison to a conventional forced rupture, the limit force needed for the triggering can be set much more precisely. In order to create the free space needed to decouple a rotor after the triggering, the buckling structure is arranged between two support structures so that, when the buckling structure collapses, the volume of the safety device is reduced. Therefore, the safety device according to the invention allows a simple and inexpensive production of a precise mechanical safety means that, unlike the state of the art, can also be used in places where this was not possible until now because the differences between the unbalance forces and the forces that are present during the normal operation are too small, for example, in turbines. Therefore, an additional advantage is that the weight of the turbine components or of the bearing arrangement can be reduced since these components no longer have to be dimensioned for the maximum possible unbalance forces, but rather only for the defined limit force. The support structures are preferably dimensioned to be more stable than the buckling structure so that, when the buckling load is exceeded, they do not collapse or become deformed at all, or at least not to any great extent. Preferably, the safety device comprises several stacked support structures between each of which a buckling structure is arranged. The support and buckling structures can be configured as micro-structures so that a plurality of buckling structures arranged quasi parallel achieve a particularly narrow scatter of the buckling process in comparison to a forced rupture. This permits the limit force to be set very precisely.

In an advantageous embodiment of the invention, at least one of the support structures of the safety device has cavities. On the one hand, this leads to an improvement in the mechanical stability of the support structure or support structures and, on the other hand, to advantageous weight savings.

Additional advantages arise in that the cavities, at least in certain areas, are arranged in a regular formation and/or, at least in part, are configured with a polygonal cross section, especially as regular polygons. Due to the regular arrangement of the cavities, uniform mechanical stability is achieved over the entire extension of the support structures. If the cavities are configured with a polygonal cross section, that is to say, if they have, for instance, 3, 4, 5, 6, 7, 8, 9, 10, 11, 12, 13, 14, 15, 16 or 17 corners, the force introduction paths along the safety device can be defined very precisely. For example, anisotropic or isotropic force introduction paths can be systematically defined. Preferably, the cross sections of the cavities are configured as regular polygons, for example, as an equilateral triangle or a regular hexagon, as a result of which an especially high mechanical stability as well as a compact and space-saving configuration of the support structures can be achieved.

In another advantageous embodiment of the invention, it is provided that the buckling structure comprises at least one buckling element, especially a buckling plate, whose opposite end sections are each connected to a support structure and which is laterally bent and buckled when the buckling structure collapses. In other words, the buckling structure comprises one buckling element or preferably several buckling elements, both ends of which are connected to a support structure and which are laterally bent and buckled when the buckling structure collapses according to the fourth order Euler buckling mode. The buckling element(s) is/are preferably configured as buckling plates or they are plate-shaped. Moreover, it can fundamentally be provided that the buckling element(s) configured as buckling plate(s) can have uniform or non-uniform cross section geometries, that is to say, they can be configured to be locally thickened or thinned, in order to achieve a specific buckling behavior. Moreover, it can be provided that the buckling element(s) is/are made of a single material or of several different materials.

Additional advantages arise in that an extension axis of the at least one buckling element is arranged at least essentially perpendicular and/or not at a right angle relative to the individual main extension planes of the support structures. In other words, it is provided that the at least one buckling element is arranged, for example, at an angle of approximately 10°, 11°, 12°, 13°, 14°, 15°, 16°, 17°, 18°, 19°, 20°, 21°, 22°, 23°, 24°, 25°, 26°, 27°, 28°, 29°, 30°, 31°, 32°, 33°, 34°, 35°, 36°, 37°, 38°, 39°, 40°, 41°, 42°, 43°, 44°, 45°, 46°, 47°, 48°, 49°, 50°, 51°, 52°, 53°, 54°, 55°, 56°, 57°, 58°, 59°, 60°, 61°, 62°, 63°, 64°, 65°, 66°, 67°, 68°, 69°, 70°, 71°, 72°, 73°, 74°, 75°, 76°, 77°, 78°, 79°, 80°, 81°, 82°, 83°, 84°, 85°, 86°, 87°, 88°, 89°, 90°, 91°, 92°, 93°, 94°, 95°, 96°, 97°, 98°, 99°, 100°, 101°, 102°, 103°, 104°, 105°, 106°, 107°, 108°, 109°, 110°, 111°, 112°, 113°, 114°, 115°, 116°, 117°, 118°, 119°, 120°, 121°, 122°, 123°, 124°, 125°, 126°, 127°, 128°, 129°, 130°, 131°, 132°, 133°, 134°, 135°, 136°, 137°, 138°, 139°, 140°, 141°, 142°, 143°, 144°, 145°, 146°, 147°, 148°, 149°, 150°, 151°, 152°, 153°, 154°, 155°, 156°, 157°, 158°, 159°, 160°, 161°, 162°, 163°, 164°, 165°, 166°, 167°, 168°, 169° or 170° relative to the associated main extension planes of the adjacent support structures. Owing to the at least essentially perpendicular arrangement, that is to say, an arrangement at an angle between about 80° and about 100°, on the one hand, a mechanically stable joining is ensured during normal operation, whereas, on the other hand, in case of a collapse, a very large volume reduction can be achieved. Since the buckling element is not positioned at a right angle, for instance, at an angle between about 10° and about 70° relative to the main extension plane of the adjacent support structures, it is ensured that the buckling structure—which is not in the collapsed state—is stabilized against tilting laterally. In this manner, it is advantageous that there is no need for additional stabilization elements or the like.

In another advantageous embodiment of the invention, the buckling structure comprises at least one stabilization element that connects the two support structures. A stabilization element as set forth in the present invention, unlike a buckling element, is fundamentally configured in such a way that, if the buckling structure collapses—that is to say, when it is subject to lateral forces that are greater than the predetermined limit value, perpendicular to the direction of the limit force—on the one hand, the stabilization element itself is not buckled or deformed if at all possible, and, on the other hand, said stabilization element hardly or not at all hinders or even prevents the collapse of the buckling structure. For this purpose, the stabilization element can be configured, for instance, as a stabilization plate.

Additional advantages arise if the stabilization element is configured to maintain the mechanical integrity of the support structures when the buckling structure is in the collapsed state and/or to prevent a tilting of the buckling structure when it is in the non-collapsed state. A stabilization element that is configured to maintain the mechanical integrity of the support structures when the buckling structure is in the collapsed state very reliably prevents the safety device from breaking apart during the collapse and after the collapse of a given buckling structure. As an alternative or in addition, the stabilization element can prevent a lateral tilting of the buckling structure when it is in the non-collapsed state. In this manner, an undesired "triggering" or an uncontrolled collapse of the buckling structure can be prevented very reliably.

Additional advantages arise if an extension axis of the stabilization element is not arranged at a right angle, but rather especially at an angle between 40° and 50°, relative to individual main extension planes of the support structures. For example, the extension axis and the main extension planes form an angle of 40°, 41°, 42°, 43°, 44°, 45°, 46°, 47°, 48°, 49° or 50°. This ensures that, when the buckling structure collapses, the stabilization element is arranged parallel or at least virtually parallel to the individual main extension planes of the support structures, thereby taking up as little volume as possible. Furthermore, such an arrangement of the stabilization element(s) very reliably ensures that, when the buckling structure collapses, that is to say, upon being subjected to lateral forces perpendicular to the direction of the limit force, on the one hand, said stabilization element(s) do not buckle if at all possible, and, on the other hand, they do not unnecessarily hinder or even prevent the collapse of the buckling structure.

In another advantageous embodiment of the invention, the stabilization element is configured so as to be thickened between its joining areas to the two support structures. In this manner, in case of a collapse, an undesired buckling of the stabilization element(s) due to lateral forces is very reliably prevented.

In another advantageous embodiment of the invention, it is provided that at least one buckling element and at least one stabilization element have a shared joining area where they are joined to a support structure. In this manner, in case of a collapse, an articulated and space-saving connection of the buckling and stabilization elements is achieved. It can be provided that at least one stabilization element extends between a first buckling element and a second buckling element that is adjacent to the first buckling element. In this manner, a targeted stiffening of the buckling structure can be achieved. It can fundamentally be provided that a stabilization element is arranged only between some pairs of buckling elements or else between all pairs of them, resulting in a very precise control of the collapsing behavior. As an alternative or in addition, it is provided for the safety device to have a different number of buckling elements and stabilization elements. This, too, makes it possible to very precisely set the collapsing behavior of the buckling structure(s) as well as the buckling load required for the collapse.

A second aspect of the invention relates to a method for the production of a safety device for a bearing arrangement of a rotor of a turbomachine in which, according to the invention, at least one buckling structure is arranged between at least two support structures, whereby the buckling structure is configured in such a way that it collapses when a predetermined buckling load that acts on at least one of the support structures is exceeded, thereby reducing the volume of the safety device. In other words, within the scope of the method according to the invention, a buckling structure arranged between support structures is created which, unlike the state of the art, collapses or buckles without rupturing when a limit value is exceeded. In comparison to a conventional forced rupture, the limit force needed for the triggering can be set much more precisely with the safety device that is produced according to the invention. In order to create the free space needed to decouple a rotor after the triggering, the buckling structure is arranged between two support structures so that, when the buckling structure collapses, the volume of the safety device is reduced. By means of the method according to the invention, the safety device can be produced simply and inexpensively and can be used as a precise mechanical safety means which, unlike the state of the art, can also be used in places where this was not possible until now because the differences between the unbalance forces and the forces that are present during the normal operation are too small, for example, in turbines. Therefore, an additional advantage is that the weight of the turbine components or of the bearing arrangement can be reduced since these components no longer have to be dimensioned for the maximum possible unbalance forces, but rather only for the defined limit force. The support structures are preferably dimensioned to be more stable than the buckling structure so that, when the desired force limit value is exceeded, they do not collapse at all or at least not to any great extent. Preferably, the safety device is made of several stacked support structures between each of which there is a buckling structure. The support and buckling structures can be configured as micro-structures so that a plurality of buckling structures arranged quasi parallel achieve a particularly narrow scatter of the buckling process in comparison to a forced rupture. This permits the limit force to be set very precisely.

In an advantageous embodiment of the invention, it is provided that the safety device is produced generatively, at least in part, especially a by selective laser sintering process, and/or that the safety device is produced, at least in part, on the component of the bearing arrangement of the rotor of the turbomachine that is associated with this safety device. The use of generative production methods, for example, selective laser sintering, permits an especially simple and inexpensive production of the safety device, along with a limit force that can be set very precisely. Moreover, generative production methods allow an especially high level of design and geometric freedom. However, it can also be provided that at least some areas of the safety device, for example, the buckling elements and/or stabilization elements, can be produced conventionally. Thus, for example, the buckling structure can be produced conventionally, for instance, by means of primary processing, and then joined to the support structures by means of a generative method. It can also be provided that the safety device is generated on a component of the bearing arrangement, that is to say, directly at the place where it is going to be used, as a result of which an especially efficient and inexpensive production of the bearing arrangement is possible.

Additional advantages arise when the safety device is made, at least in part, of a metal, of an especially high-temperature-resistant metal alloy, of a ceramic material, of an organic and/or inorganic plastic, or of a mixture of two or more of these materials. For example, the safety device can be made partially or entirely of titanium, a titanium alloy, a nickel-based alloy, stainless steel, ceramic or an organic and/or inorganic plastic. This permits a particularly flexible production of the safety device and means that the limit forces required for the collapse can be set very precisely.

A third aspect of the invention relates to a bearing arrangement of a rotor of a turbomachine, especially an aircraft engine, in which it is provided according to the invention that the bearing arrangement comprises a safety device according to the first aspect of the invention and/or a safety device that can be or has been obtained by means of a method according to the second aspect of the invention. The features arising from this and their advantages can be gleaned from the descriptions of the first and second aspects of the invention, whereby advantageous embodiments of the first and second aspects of the invention can be seen as advantageous embodiments of the third aspect of the invention and vice versa.

In an advantageous embodiment of the invention, it is provided for the safety device to be arranged in such a way that its buckling structure collapses as soon as the moving rotor experiences a dynamic unbalance that exceeds a predetermined limit value, and/or in such a way that, if the buckling structure has collapsed, it is at least largely prevented that radial loads that exceed a predetermined limit value are transmitted from the moving rotor to the bearing arrangement. This means that, in case of damage to the rotor, for instance, if a blade breaks and if extreme radial loads occur, it is possible to very reliably decouple the rotor from the static structures and to attain a correspondingly good protection against damage to the bearing arrangement or other components of a turbomachine, for example, an aircraft engine.

BRIEF DESCRIPTION OF THE DRAWINGS

Additional features of the invention can be gleaned from the claims, from the embodiments as well as making reference to the drawings. The features and feature combinations cited in the description above as well as the features and feature combinations cited in the embodiments below can be used not only in each of the indicated combinations, but also in other combinations, without departing from the scope of the invention. The following is shown:

DETAILED DESCRIPTION

Figure 1:
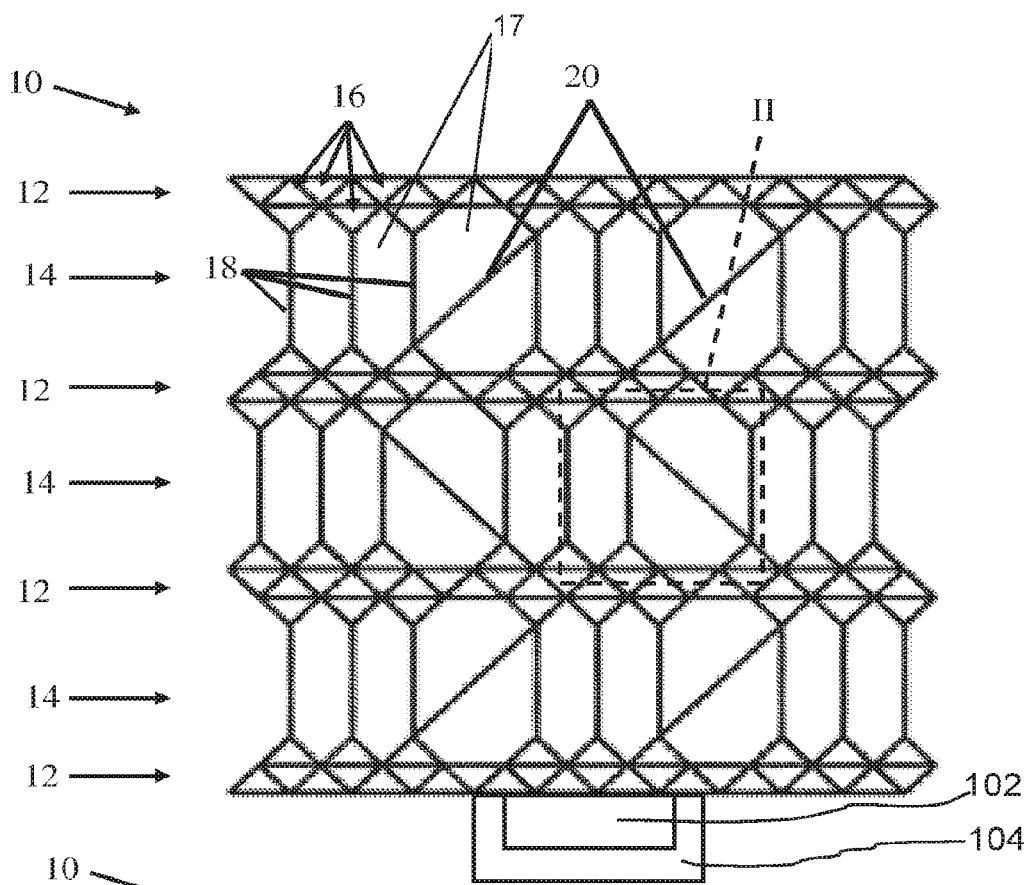
FIG. 1 a schematic side sectional view of a safety device according to the invention.
Figure 2:
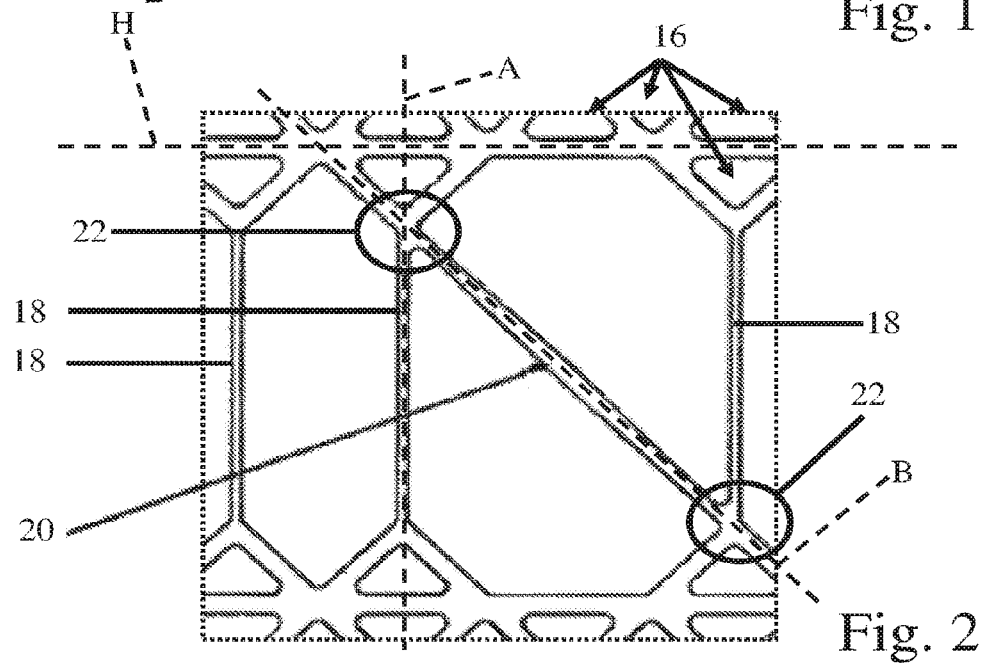
FIG. 2 an enlarged depiction of the detail II shown in FIG. 1.

FIG. 1 shows a schematic side sectional view of a safety device 10 according to the invention for a bearing arrangement 102 of a rotor of an aircraft engine 104, shown solely schematically. As a micro-structure, the safety device 10 comprises, by way of an example, an arrangement of four support structures 12 between each of which there is a buckling structure 14. The safety device 10 will be explained below in conjunction with FIGS. 2 and 3. FIG. 2 shows an enlarged depiction of the detail II shown in FIG. 1, whereas FIG. 3 shows a schematic side sectional view of the safety device 10 of FIG. 1 with a collapsed buckling structure 14.

Figure 3:
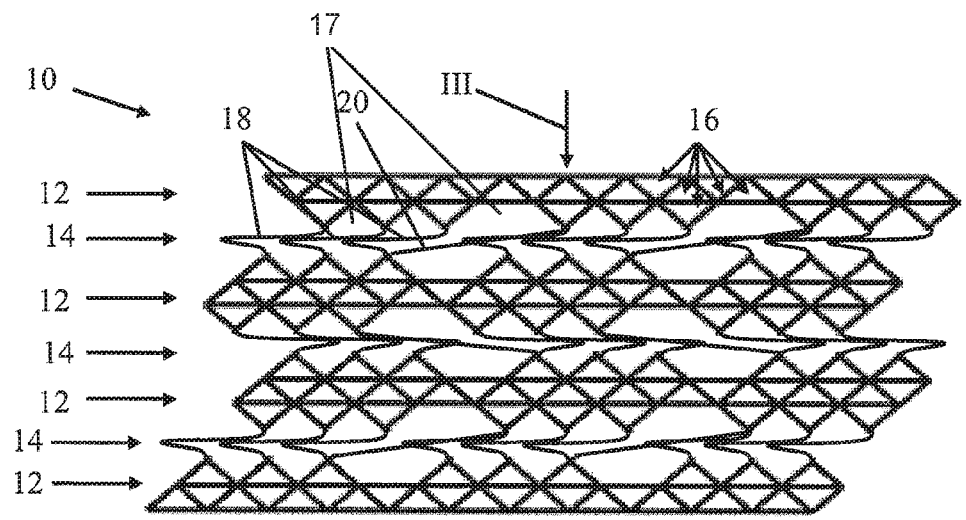
FIG. 3 a schematic side sectional view of the safety device shown in FIG. 1, with a collapsed buckling structure.

The buckling structures 14 are configured in such a way that they collapse, thereby reducing the volume of the safety device 10, when a predetermined buckling load that acts on at least one of the support structures 12 and that is indicated in FIG. 3 by the arrow III is exceeded. In contrast, the support structures 12 are configured to be so stable that they mechanically separate the individual buckling structures 14 from each other, in other words, at least for the most part, they do not transmit any deformation forces from one buckling structure 14 into another buckling structure 14. Moreover, FIG. 3 shows that the support structures 12 are configured to be mechanically so stable that, when the buckling structures 14 collapse, they do not become deformed at all or at least not to any great extent. For this purpose, the support structures 12 have cavities 16 that are arranged regularly and whose cross section has the shape of equilateral triangles. For the sake of clarity, only a few of the cavities 16 have been designated by reference numerals in FIGS. 1 to 3 by way of example. Fundamentally, the support structures 12 can also be configured differently and can have, for example, irregularly arranged cavities 16, or else they can be like corrugated cardboard, with a wavy wall arranged between two limiting walls.

The buckling structures 14 each comprise several buckling elements 18 configured as buckling plates. For the sake of clarity, only a few of the buckling elements 18 have been designated by reference numerals in FIGS. 1 to 3 by way of example. The opposite end sections of the buckling elements 18 are each connected to one of the adjacent support structures 12. The extension axes A of the buckling elements 18 are arranged at least essentially perpendicular to the individual main extension planes H of the support structures 12 that are shown in FIG. 2 by a broken line.

As can be seen from FIG. 3, the buckling elements 18 are laterally bent and buckled due to the buckling load indicated by the arrow III when the buckling structure 14 collapses into voids 17 (only two of which are labeled for clarity), thereby reducing the volume of the safety device 10. The length and thickness of the individual buckling elements 18 are dimensioned in such a way that said buckling elements 18 buckle according to the fourth order Euler buckling mode, as a result of which the limit force or buckling load indicated by the arrow III in FIG. 3 can be precisely set. As can be seen especially clearly in FIG. 2, the buckling structures 14 each comprise several stabilization elements 20 by means of which the mechanical integrity of the support structures 12 is ensured when the buckling structures 14 are in the collapsed state. In contrast to the extension axes A of the buckling elements 18 indicated in FIG. 2 by a broken line, the extension axes B of the stabilization elements 20 are arranged at an angle of about 45° relative to the individual main extension axes H of the support structures 12 and they extend diagonally between some of the adjacent buckling elements 18. As can be seen in FIG. 1, in the embodiment shown, as indicated in FIG. 2 by a broken line, the angles of the extension axes B in adjacent buckling structures 14 alternate between 45° and −45° (or 315°). On the one hand, this permits the collapsed buckling structures 14 to be arranged compactly and, on the other hand, it makes it possible to precisely set the limit force that is required for the collapse. However, it should be emphasized that, even deviating arrangements of the stabilization elements 20 can be provided. Moreover, one can see that the buckling structures 14 comprise more buckling elements 18 than stabilization elements 20. As can be seen especially in FIG. 2, the buckling elements 18 and the stabilization elements 20 have shared joining areas 22 to the individual support structures 12, as a result of which an articulated and spacesaving connection is achieved. Since the stabilization elements 20, which are configured here as stabilization plates, should not buckle, if at all possible, when the buckling structures 14 collapse upon being subjected to lateral forces perpendicular to the direction of the limit force (arrow III), but should likewise not prevent the collapse of the buckling elements 18, the cross section of the joining areas 22 of the stabilization elements 20 is configured to be as thin as possible or to have a similar thickness to that of the buckling elements 18, so that they can have an articulated action here. Towards the center, however, in contrast to the buckling elements 18, the stabilization elements 20 have a thickened or reinforced cross section in order to prevent buckling upon being subjected to lateral forces when the buckling structures 14 collapse. Due to the plurality of buckling elements 18 arranged in parallel and due to the narrow scatter of the buckling process in comparison, for example, to a forced rupture, the limit force indicated in FIG. 3 by the arrow III can be set very precisely.

The safety device 10 is produced generatively, partially or completely, as a result of which the relatively complex cavity geometries can be produced quickly, simply and precisely. For example, the generally known selective laser sintering process can be used as the generative method. However, other production methods as well as combinations of different production methods can also be provided. For instance, the buckling elements 18 and/or the stabilization elements 20 can be produced conventionally and then joined to the support structures 12 by means of a selective laser sintering process.

Figure 4:
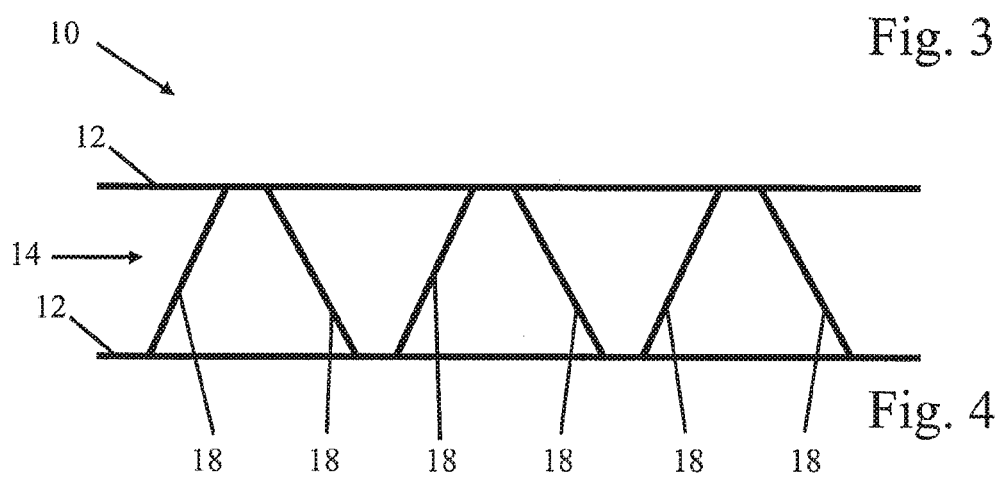
FIG. 4 a schematic diagram of the safety device according to the invention, according to a second embodiment.

FIG. 4 shows a schematic diagram of the safety device 10 according to the invention, according to a second embodiment. In contrast to the preceding embodiment, the safety device 10 is configured without stabilization elements 20. In order to prevent the buckling structure 14 from tilting laterally when it is not in the collapsed state, the buckling elements 18 are positioned at an angle here. In the embodiment shown, it can be seen that the buckling elements 18 are arranged alternately at angles of about 45° or about 135° relative to the planar support structures 12 and that they at least approximately form a "Λ"-like a structure that is similar to a house of cards. Fundamentally, however, it is also possible for the buckling elements 18 to have different angles or angle sequences and relative distances with respect to each other.

Figure 5:
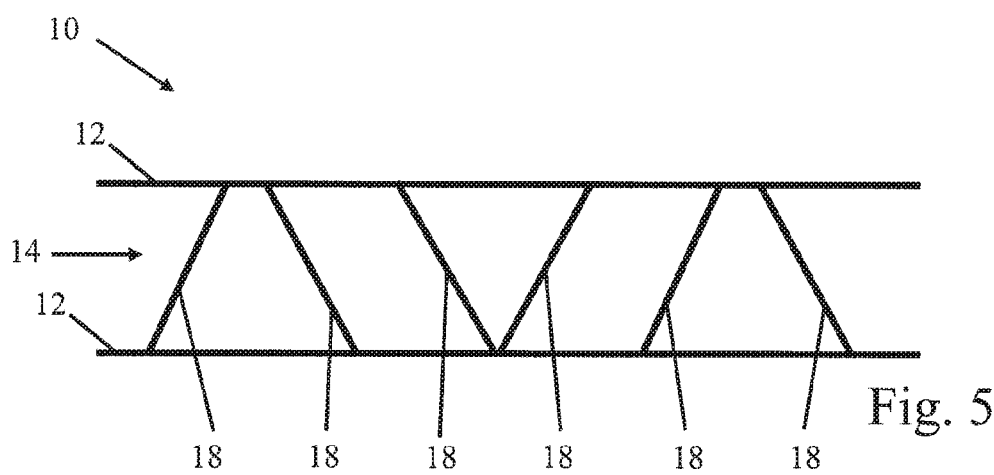
FIG. 5 a schematic diagram of the safety device according to the invention, according to a third embodiment.

FIG. 5 shows a schematic diagram of the safety device 10 according to the invention, in a third embodiment. One can see that one pair of buckling elements 18 that together form an approximately "Λ"-like structure is followed by another pair of buckling elements 18 that form a "V"-like structure with a shared joining area to the lower support structure 12. This is followed by a pair of buckling elements 18 that together form an approximately "Λ"-like structure. By the same token, analogously to the first embodiment, it can be provided for more than two support structures 12 to be stacked above each other, whereby the buckling structures 14 arranged between the support structures 12 each have buckling elements 18 positioned at different angles.

What is claimed is:

1. A safety device for a bearing arrangement of a rotor of a turbomachine, the safety device comprising:
    at least two support structures; and
    at least one buckling structure between the at least two support structures;
    at least one void adjacent to the at the least one buckling structure;
    wherein the at least one buckling structure is configured to collapse into the at least one void when a predetermined buckling load acting on at least one of the support structures is exceeded, the collapse reducing a volume of the safety device.

2. The safety device as recited in claim 1 wherein at least one of the support structures has cavities.

3. The safety device as recited in claim 2 wherein the cavities, at least in certain areas, are configured with a polygonal cross section.

4. The safety device as recited in claim 3 wherein the cavities are configured with a regular polygonal cross section.

5. The safety device as recited in claim 1 wherein the buckling structure including at least one buckling element, whose opposite end sections are each connected to a support structure, the buckling element being laterally bent and buckled when the buckling structure collapses.

6. The safety device as recited in claim 5 wherein the buckling element is a buckling plate.

7. The safety device as recited in claim 5 wherein an extension axis of the at least one buckling element is arranged perpendicular to the individual main extension planes of the support structures.

8. The safety device as recited in claim 5 wherein an extension axis of a stabilization element connecting the two support structures is arranged not at a right angle to individual main extension planes of the support structures.

9. The safety device as recited in claim 5 wherein the at least one buckling element and at least one stabilization element have a shared joining area where the buckling element and the stabilization element are joined to a support structure, and/or the at least one stabilization element extends between a first buckling element and a second buckling element adjacent to the first buckling element, and/or the safety device has a different number of buckling elements and stabilization elements.

10. The safety device as recited in claim 1 wherein the buckling structure includes at least one stabilization element connecting the two support structures.

11. The safety device as recited in claim 10 wherein the stabilization element is configured to maintain the mechanical integrity of the support structures when the buckling structure is in the collapsed state and/or to prevent a tilting of the buckling structure when said the buckling structure is in the non-collapsed state.

12. The safety device as recited in claim 10 wherein an extension axis of the stabilization element is not arranged at a right angle relative to individual main extension axes of the support structures.

13. The safety device as recited in claim 12 wherein the extension axis of the stabilization element is arranged at an angle between 40° and 45° relative to the individual main extension axes of the support structures.

14. The safety device as recited in claim 10 wherein the stabilization element is configured so as to be thickened between joining areas to the two support structures.

15. A bearing arrangement of a rotor of a turbomachine comprising a safety device as recited in claim 1.

16. An aircraft engine comprising the bearing arrangement as recited in claim 15.

17. The bearing arrangement as recited in claim 15 wherein the safety device is arranged in such a way that the buckling structure collapses as soon as the moving rotor experiences a dynamic unbalance that exceeds a predetermined limit value, and/or in such a way that, if the buckling structure has collapsed, the buckling structure prevents radial loads that exceed a predetermined limit value from being transmitted from the moving rotor to the bearing arrangement.

18. A method for making a safety device for a bearing arrangement of a rotor of a turbomachine, the safety device comprising at least one buckling structure arranged between at least two support structures, the method comprising forming the buckling structure in such a way that the buckling structure collapses into at least one adjacent void when a predetermined buckling load that acts on at least one of the support structures is exceeded, thereby reducing the volume of the safety device.

19. The method as recited in claim 18 wherein the safety device is produced generatively, at least in part.

20. The method as recited in claim 19 wherein the safety device is produced generatively, at least in part, by a selective laser sintering process.

21. The method as recited in claim 18 wherein the safety device is made of one of a metal, of a ceramic material, of an organic plastic or inorganic plastic, or of a mixture of two or more of these materials.

22. The method as recited in claim 21 wherein the safety device is made of a metal alloy.

23. A bearing arrangement of a rotor of a turbomachine comprising a safety device as manufactured in accordance with the method of claim 18.

* * * * *